(12) United States Patent
Tillack et al.

(10) Patent No.: US 7,001,972 B1
(45) Date of Patent: *Feb. 21, 2006

(54) POLYAMINES COMPRISING UREA GROUPS, METHOD FOR THEIR PRODUCTION, AND THEIR USE AS HARDENERS FOR EPOXIDE RESINS

(75) Inventors: Jörg Tillack, Bergisch Gladbach (DE); Lutz Schmalstieg, Köln (DE); Wolfgang Puetz, Hünxe (DE); Gerhard Ruttmann, Burscheid (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/048,329

(22) PCT Filed: Jul. 17, 2000

(86) PCT No.: PCT/EP00/06803

§ 371 (c)(1), (2), (4) Date: Feb. 27, 2002

(87) PCT Pub. No.: WO01/09215

PCT Pub. Date: Feb. 8, 2001

(30) Foreign Application Priority Data

Jul. 28, 1999 (DE) .............................. 199 35 329

(51) Int. Cl.
*C08G 18/80* (2006.01)

(52) U.S. Cl. .......................... 528/45; 528/60; 528/61; 528/73

(58) Field of Classification Search ................ 528/45, 528/60, 61, 73, 122, 121
See application file for complete search history.

(56) References Cited

U.S. PATENT DOCUMENTS

| 3,993,708 | A | | 11/1976 | Brinkmann et al. ..... 260/830 P |
|---|---|---|---|---|
| 4,435,558 | A | | 3/1984 | Burba et al. .................. 528/45 |
| 5,187,253 | A | | 2/1993 | Wolf ............................ 528/49 |
| 5,219,975 | A | | 6/1993 | Schmalstieg et al. ......... 528/45 |
| 6,060,574 | A | * | 5/2000 | Schmalstieg |

FOREIGN PATENT DOCUMENTS

| CA | 1219986 | 3/1987 |
|---|---|---|
| DE | 4200172 | 7/1993 |
| EP | 0 082 983 | 2/1987 |
| EP | 0 293 110 | 11/1988 |
| EP | 0 950 675 | 10/1999 |
| GB | 1399257 | 7/1975 |
| GB | 1411485 | 10/1975 |

OTHER PUBLICATIONS

**Patent Abstracts of Japan, vol. 1998, No. 12, Oct. 31, 1998 & JP 10 195290 A (Ashai Glass Co. Ltd.), Jul. 28, 1998.

* cited by examiner

*Primary Examiner*—Rachel Gorr
(74) *Attorney, Agent, or Firm*—Joseph C. Gil; Thomas W. Roy

(57) ABSTRACT

The present invention provides polyamines which contain urea groups, a process for the preparation thereof and their use to produce adhesives, sealants, embedding compounds, moulded items or coatings.

15 Claims, No Drawings

POLYAMINES COMPRISING UREA GROUPS, METHOD FOR THEIR PRODUCTION, AND THEIR USE AS HARDENERS FOR EPOXIDE RESINS

BACKGROUND OF THE INVENTION

The present invention provides polyamines which contain urea groups, a process for the preparation thereof and their use to produce adhesives, sealants, embedding compounds, moulded items or coatings.

Polyamine/epoxide resin systems are characterised, inter alia, by excellent adhesion to metals, very good resistance to chemicals and outstanding corrosion prevention properties. In the case of solvent-containing formulations and powder coating systems, cross-linked films with high flexibility are obtained by using epoxide resins with high molecular weights and/or polyaminoamides, e.g. those based on dimeric fatty acids, as hardeners. Coatings based on solvent-free liquid resins and solvent-free amino hardeners are brittle due to the low molecular weights of the epoxide resins and the high network density resulting therefrom. Nowadays, therefore, tar substitutes, e.g. coumarone resins, are used for plasticising purposes in solvent-free formulations. These types of coating tend to become brittle in the long term, in particular when using relatively large amounts of hydrocarbon resins, due to migration of the non-functional constituents.

Good and permanent elastification of epoxide resins can be achieved by combining them with polyurethanes. Thus, e.g. in DE-A 23 38 256, high molecular weight amine-terminated polyetherurethane ureas are prepared by reacting prepolymers which contain free isocyanate groups with amines in highly dilute solution and then curing the product with epoxide resins.

The use of the, in particular aromatic, solvents required for this is a disadvantage in practice, both from an industrial and also a physiological point of view. On the other hand, the viscosity of the solvent-free reaction products, such as those prepared in accordance with DE-A 23 38 256, is too high for use in practice.

DE-A 24 18 041 describes a process for preparing elasticised moulded articles and two-dimensional structures in which epoxide and amine compounds are reacted which are obtained by hydrolysis of prepolymeric ketimines or enamines. Using this process, thermoset materials which are resistant to chemicals, adhere well and have improved properties are obtained. However, the process described is costly from a technical point of view.

DE-A 21 52 606 describes reactive systems based on alkylphenol-blocked polyisocyanates and polyamines, which may optionally also be cured in combination with epoxide resins. These reactive systems are also associated with some technical disadvantages: on the one hand, the blocking agents being released have comparatively low molecular weight so they migrate out of the coating over the course of time, which can lead to adhesion problems. On the other hand, reactive systems based on alkylphenol-blocked polyisocyanates and polyamines have a relatively high viscosity and the actual mechanical properties of the end products do not satisfy all requirements.

In contrast to this, EP-A 480 139 describes a process for reacting non-blocked NCO prepolymers with polyamines at temperatures of 140–170° C. However, this process can be applied only to prepolymers with aliphatic or cycloaliphatic isocyanate groups due to the very high reactivity of aromatic isocyanate groups when reacting with amines. Since aliphatic and cycloaliphatic isocyanates can be prepared only in a more costly manner (more expensively) than aromatic isocyanates, polyurethanurea amines prepared by this method have hitherto been of no industrial significance.

In order to facilitate targeted reaction of polyisocyanate prepolymers with excess amounts of diamine, it has therefore been suggested on several occasions that the polyisocyanates be used in a blocked form, as described for instance, in CA-A 12 19 986, EP-A 293 110 or EP-A 82 983. These publications disclose using, as preferred blocking agents, phenols or substituted phenols. After completion of reaction with the polyamines, these phenols cannot be removed, or not completely removed, from the reaction mixture by distillation, due to their high boiling point. Retention of these optionally substituted phenols in the mixture or in the plastic materials, however, leads to the disadvantages mentioned above. Furthermore, it is pointed out in these publications that in principle the other conventional blocking agents from polyurethane chemistry may also be used, e.g. oximes, caprolactam, malonates and acetoacetates. However, since none of these blocking agents can be incorporated into the polymer structure during the course of epoxide hardening, these types of compounds are not normally used in traditional amine/epoxide chemistry. The use of such blocking agents instead of the preferably used, optionally substituted, phenols, does not provide significant advantages.

In accordance with EP-A 457 089, on the other hand, secondary amines with preferably low boiling points are used as blocking agents. If these amines are retained in the reaction mixture after de-blocking, slow evaporation of the very pungent compounds (odour pollution) readily takes place. Although in principle the secondary amine can be incorporated into the system when used in epoxide systems, this takes place relatively slowly, especially in the case of applications at low temperatures (e.g. room temperature) so that some of the amines evaporate before reacting. In a particularly preferred application, the amine blocking agent is distilled out of the reaction mixture after de-blocking. Although this procedure leads to products which do not release a gas (odour pollution), it is very costly.

Thus, the object of the invention was to provide elasticising, amine hardener mixtures for epoxides which do not have the disadvantages of the systems in the prior art.

The object can be achieved by the provision of the hardener mixtures according to the invention and the process for preparing them which are described in detail below.

SUMMARY OF THE INVENTION

The invention provides urea group-containing, amine hardener mixtures for epoxide resins, prepared by reacting
A) a polyisocyanate component, consisting of at least one organic polyiso-cyanate, in which at least 95 mol. % of the NCO groups are reversibly blocked by reaction with at least one phenolic group-containing hydrocarbon resin with a concentration of hydroxyl groups, calculated as OH, molecular weight=17, of 0.1% to 10.0%, with
B) at least one organic polyamine in a ratio by equivalents of amine groups to blocked NCO groups of 2:1 to 50:1.

The invention also provides a process for preparing these urea group-containing, amine hardener mixtures.

The invention also provides the use of these urea group-containing, amine hardener mixtures in combination with the epoxide resins conventionally used in plastics and coating technology, optionally in combination with catalysts, auxiliary substances and additives conventionally used in plastics and coating technology, to prepare adhesives, sealants, embedding agents, moulded items or coatings.

DETAILED DESCRIPTION OF THE INVENTION

The invention is based on the surprising observation that reactive systems based on urea group-containing, amine hardener mixtures according to the invention and epoxides cure to give plastics materials which are characterised by long-term elastification with a surprisingly beneficial relationship between plasticity on the one hand and elasticity on the other hand.

The starting compounds for preparing part A) in urea group-containing amine hardener mixtures according to the invention are organic polyisocyanates in which at least 95 mol. % of the NCO groups are reversibly blocked by reaction with at least one phenolic OH group-containing hydrocarbon resin of the type described in detail below.

Polyisocyanates which are suitable for preparing part A) which is an essential constituent of the invention are organic polyisocyanates or polyisocyanate mixtures with a (mean) molecular weight, determined from the isocyanate content and functionality, of 168 to 25000, preferably 1000 to 12000. Suitable starting polyisocyanates are aliphatic isocyanates known per se from polyurethane chemistry such as hexamethylene diisocyanate, isophorone diisocyanate, dicyclohexylmethane diisocyanate, the isomers of diphenylmethane diisocyanates and their higher homologues such as are produced by phosgenation of aniline/formaldehyde condensation products, aromatic diisocyanates such as 2,4- and 2,6-toluylene diisocyanate and their technical grade mixtures. Also suitable are secondary products known per se of the isocyanates mentioned with biuret, isocyanurate, iminooxadiazinedione, uretdione, allophanate and/or urethane structures.

The polyisocyanates for preparing the starting compounds A) are preferably isocyanate group-containing prepolymers such as can be obtained in a manner known per se by reacting low or high molecular weight polyhydroxyl compounds with excess amounts of the previously mentioned di- and polyisocyanates or even with a large excess of the di- and polyisocyanates mentioned followed by removal of the excess polyisocyanate, e.g. by thin layer distillation. Aromatic polyisocyanates with a molecular weight in the range 174 to 300 are particularly preferably used to synthesise the prepolymers. The prepolymers are generally prepared at 40 to 140° C., optionally also using catalysts known per se from polyurethane chemistry such as, for example, organometallic compounds such as tin(II) octoate, dibutyltin(II) diacetate, dibutyltin(II) dilaurate or tertiary amines such as triethylamine or diazabicyclooctane.

Low molecular weight polyhydroxyl compounds with molecular weights in the range 62 to 299 such as, for example, ethylene glycol, propanediol-1,2, propylene glycol-1,3, butanediol-1,2, butanediol-1,3, butanediol-1,4, pentanediol-1,2, pentanediol-1,5, hexanediol-1,6, octanediol-1,8, dodecanediol-1,12, neopentyl glycol, 2-ethylhexane-diol-1,3, trimethylpentanediols, butylethylpropanediol-1,3, cyclohexanedimethanols, glycerol, trimethylolpropane, pentaerythritol, low molecular weight hydroxyl group-containing esters of these types of polyols with dicarboxylic acids of the type mentioned below by way of example or low molecular weight ethoxylation or propoxylation products of these types of simple polyols or any mixture of these types of modified or non-modified alcohols are suitable for preparing these types of prepolymers.

High molecular weight polyhydroxyl compounds with a molecular weight in the range 300 to 20000, preferably 1000 to 8000, of the type known per se from polyurethane chemistry are preferably used to prepare the prepolymers. High molecular weight polyhydroxyl compounds for preparing the prepolymers are, for example, polyesterpolyols corresponding to the specified data which are based on low molecular weight simple alcohols of the type mentioned above by way of example and polybasic carboxylic acids such as, for example, adipic acid, sebacic acid, phthalic acid, isophthalic acid, tetrahydrophthalic acid, hexahydrophthalic acid, maleic acid, the anhydrides of these types of acids or any mixture of these types of acids or anhydrides. Hydroxyl group-containing polylactones corresponding to the data given above, in particular poly-ε-caprolactone, are also suitable for preparing the prepolymers or semiprepolymers.

Polyetherpolyols corresponding to the specifications given above, such as can be obtained in a manner known per se by the alkoxylation of suitable starter molecules, are particularly preferred for preparing isocyanate-group containing prepolymers. Suitable starter molecules are, for example, the simple polyols already mentioned above, water, organic polyamines with at least two N—H bonds or any mixture of these types of starter molecules. Alkylene oxides which are suitable for the alkoxylation reaction are in particular ethylene oxide and/or propylene oxide, which may be used in any sequence or even as a mixture during the alkoxylation reaction.

Polytetramethylene glycol polyethers corresponding to the data given above, such as can be obtained in a manner known per se by cationic polymerisation of tetrahydrofuran, are also preferably suitable for preparing the prepolymers.

Also suitable for preparing the prepolymers are hydroxyl group-containing polycarbonates corresponding to the data given above, such as can be prepared, for example, by reacting simple diols of the type mentioned above with diaryl carbonates such as, for example, diphenyl carbonate or phosgene.

Polythioetherpolyols, such as can be obtained, for example, by the polycondensation of thiodiglycol with itself or with diols and/or polyols of the type mentioned, are also suitable for preparing NCO group-containing prepolymers.

Polyacetals such as e.g. the polycondensation products of formaldehyde and diols or polyols of the type mentioned, such as can be obtained, for example, by using acid catalysts such as phosphoric acid or p-toluenesulfonic acid are also suitable.

Obviously, mixtures of the hydroxyl compounds mentioned by way of example may also be used to prepare the prepolymers.

Particularly preferred polyisocyanates for part A) for preparing urea group-containing amine hardener mixtures are prepolymers based on aromatic polyisocyanates and polyetherpolyols of the type mentioned previously.

Suitable phenolic OH group-containing hydrocarbon resins which are used according to the invention for preparing the blocked polyisocyanates used as part A) are those of a generally known type such as are described, for example, in Ullmanns Encyklopädie der technischen Chemie, 4th edition, vol. 12, pages 539 to 545, (Verlag Chemie, Weinheim 1976), Kirk-Othmer, Encyclopedia of Chemical Technology, 3rd ed., vol. 12, pages 852 to 869 (John Wiley & Sons, New York 1980) or Encyclopedia of Polymer Science and Engineering, vol. 7, pages 758 to 782 (John Wiley & Sons, New York 1987). Examples of suitable phenolic OH group-containing hydrocarbon resins are coumarone/indene resins, petroleum resins or terpene resins.

These types of phenolic OH group-containing hydrocarbon resins are typically prepared by the copolymerisation of unsaturated hydrocarbons of the previously mentioned type with phenol in the presence of strong acids or catalysts of the Friedel-Crafts type. Suitable unsaturated hydrocarbons for preparing OH functional hydrocarbon resins which can be used according to the invention are the hydrocarbons produced during the cracking of naphtha or gas oil such as, for example, butene, butadiene, pentene, piperylene, isoprene, cyclopentadiene, styrene, α-methylstyrene, vinyltoluene, dicyclopentadiene, methyldicyclopentadiene, indene and methylindene. Terpene resins such as, for example, α-pinene, β-pinene, dipentene, D-limonene or turpentine are also suitable as unsaturated hydrocarbons which can be used to prepare OH-functional hydrocarbon resins which can be used according to the invention. Hydrocarbon resins which can be used have a hydroxyl group content, calculated as OH (molecular weight 17), of 0.1% to 10.0% and preferably have a hydroxyl group content of 1.0% to 6.0%. Hydrocarbon resins with a hydroxyl group content of 1.5% to 4.0% and which are liquid at room temperature are particularly preferably used to prepare part A).

Polyisocyanates with reversibly blocked isocyanate groups which are suitable for use as part A) according to the invention are prepared by reacting organic polyisocyanates of the previously mentioned type at temperatures of 40° C. to 150° C., preferably 50° C. to 1001° C. with phenolic OH group-containing hydrocarbon resins as characterised in more detail previously. The amount of phenolic OH group-containing hydrocarbon resin used in the blocking reaction should correspond to at least 95 mol. % of the amount of NCO groups. Often, a small excess of blocking agent is expedient in order to ensure complete reaction of all the isocyanate groups. The excess is generally not more than 20 mol. %, preferably not more than 15 mol. % and in particular not more than 10 mol. %, with respect to the isocyanate groups.

The blocking reaction is preferably performed with the additional use of catalysts known per se from polyurethane chemistry such as, for example, organometallic compounds such as tin(II) octoate, dibutyltin(II) diacetate, dibutyltin(II) dilaurate or tertiary amines such as triethylamine or diazabicyclooctane. The blocking reaction can optionally be performed in the presence of inert solvents or lacquer solvents such as, for example, ethyl acetate, butyl acetate, methoxypropyl acetate, methyl ethyl ketone, methyl isobutyl ketone, toluene, xylene, aromatic or (cyclo)aliphatic hydrocarbon mixtures or any mixture of these types of solvents. These conversions are preferably performed in a solvent-free manner.

Part B) for preparing the urea group-containing amine hardener mixture according to the invention quite generally consists of polyamines which may optionally also contain secondary amine groups.

Polyamines which contain at least two primary amine groups per molecule are preferably used.

Particularly preferably, polyamines which contain at least two primary amine groups per molecule and have a (mean) molecular weight of 60 to 500 are used. Suitable compounds are, for example, ethylene diamine, 1,2- and 1,3-diaminopropane, 1,4-diaminobutane, 1,6-diaminohexane, 2,2,4- and/or 2,4,4-trimethylhexamethylene diamine, the isomeric xylylene diamines, 1,4-diaminocyclohexane, 4,4'-diaminodicyclohexylmethane, 1,3-diaminocyclopentane, 4,4'-diaminodicyclo-hexyl-sulfone, 4,4'-diaminodicylohexylpropane-1,3, 4,4'-diaminodicyclo-hexylpropane-2,2, 3,3'-dimethyl-4,4'-diaminodicyclohexylmethane, 3-aminomethyl-3,3,5-trimethyl-cyco-hexylamine (isophorone diamine), 3(4)-aminomethyl-1-methylcyclohexylamine or technical grade bisaminomethyltricyclodecane, such as is sold under the name TCD-Diamin® by Hoechst AG or also those polyamines which contain secondary amine groups in addition to at least two primary amine groups such as for example diethylene triamine or triethylene tetramine.

Quite specifically preferred is the use of polyamines, in particular diamines with molecular weights in the range mentioned above, which contain one or more cyclo-aliphatic rings. These include, for example, 1,4-diaminocyclohexane, 4,4'-diamino-dicyclohexylmethane, 1,3-diaminocyclopentane, 4,4'-diamino-dicyclohexyl-sulfone, 4,4'-diaminodicyclohexylpropane-1,3, 4,4'-diaminodicyclo-hexylpropane-2,2, 3,3'-dimethyl-4,4'-diaminodicyclohexylmethane, 3-aminomethyl-3,3,5-trimethyl-cyclohexylamine (isophorone diamine), 3(4)-aminomethyl-1-methylcyclohexylamine or technical grade bisaminomethyltricyclodecane.

Adducts which are prepared by reacting an excess of the polyamines mentioned with epoxide resins of the type mentioned below can also be used as part B).

Furthermore, polyetheramines which are prepared by reacting polyetherpolyols with ammonia and are sold, for example, by Huntsman under the tradename Jeffamin® can also be used as part B).

Furthermore, polyamide resins are also suitable as part B). These types of polyamide resins, which include polyaminoamides and polyaminoimidazolines, are sold, inter alia, by Henkel under the tradename "Versamid®".

Obviously, it is also possible to use mixtures of the polyamines mentioned as part B).

The urea group-containing amine hardener mixtures according to the invention are prepared by reacting component (A) with component (B) at temperatures up to 200° C., preferably at temperatures of 10° C. to 200° C., in particular at temperatures of 40° C. to 150° C. and quite specifically at temperatures of 50° C. to 100° C.

The reaction may optionally be catalysed. Suitable catalysts are preferably compounds which contain basic nitrogen atoms. Tertiary amines, Mannich bases and amidines may be mentioned as suitable.

Urea group-containing amine hardener mixtures according to the invention are prepared by adding part A) and part B) in amounts such that the ratio by equivalents of amine groups to blocked isocyanate groups is 2:1 to 50:1, preferably 3.5:1 to 25:1, in particular 5:1 to 15:1.

Urea group-containing amine hardener mixtures according to the invention may be prepared, if required, in conventional lacquer solvents of the type mentioned above. Preparation is preferably performed, however, in a solvent-free manner.

Urea group-containing amine hardener mixtures according to the invention may be prepared in a separate reactor from that used for the synthesis of A), but are preferably prepared immediately following the synthesis of A), in the same reactor. Hardener mixtures according to the invention are liquid compounds with a H equivalent of 20 to 10,000, preferably 40 to 3,000 and in particular 50 to 500. They are preferably suitable as a hardener in combination with the epoxide resins conventionally used in plastics and coating technology, optionally in combination with the catalysts, auxiliary substances and additives conventionally used in plastics and coating technology, to produce coatings, adhesives, sealants, embedding compounds or moulded parts.

Epoxide resins conventionally used in plastics and coating technology are oxirane group-containing compounds which contain on average more than one epoxide group per molecule. Examples of suitable epoxide resins are glycidyl ethers of polyhydric alcohols, such as e.g. butanediol, hexanediol, glycerol, TMP, hydrogenated diphenylolpropane or polyhydric phenols such as e.g. resorcinol, diphenylolpropane-2,2 (bisphenol A), diphenylolmethane (bisphenol F) or phenol/aldehyde condensates. Glycidyl esters of polybasic carboxylic acids, such as hexahydrophthalic acid or dimerised fatty acids may also be used.

The use of liquid epoxide resins based on epichlorhydrin and diphenylolpropane-2,2 (bisphenol A) or diphenylolmethane (bisphenol F) or their mixtures is particularly preferred. If desired, the viscosity of the mixtures may be reduced with mono-functional epoxide compounds, which means that processing is improved. Examples of these are aliphatic and aromatic glycidyl ethers such as butyl glycidyl ether, phenyl glycidyl ether or glycidyl esters such as glycidyl versatate or epoxides such as styrene oxide or 1,2-epoxydodecane.

In the urea group-containing amine hardener mixtures according to the invention, the H equivalent of the hardener and the oxirane group equivalent of the epoxide resin are preferably present in a ratio of 0.8:1 to 1.4:1, in particular in a ratio of 0.9:1 to 1.2:1 and quite specifically in a ratio of 0.95:1 to 1.1:1.

To prepare coatings, adhesives, sealants, embedding compounds or moulded items, auxiliary agents and additives conventionally used in plastics and coating technology such as, for example, fillers, solvents, flow control agents, pigments, reaction accelerators or viscosity regulators may optionally be incorporated into the mixture of urea group-containing amine hardener mixture and epoxide resin. Reaction accelerators such as salicylic acid, bis-(dimethylaminomethyl)-phenol or tris-(dimethyl-amino-methyl)-phenol, fillers such as sands, crushed rocks, silicas, asbestos dust, kaolin, talcum, metal powders, tar, tar pitch, asphalt, scrap cork, polyamides, plasticisers such as for example phthalates or other viscosity regulators such as for example benzyl alcohol may be mentioned by way of example.

Cured plastics based on the urea group-containing amine hardener mixtures according to the invention and epoxide resins are characterised, in contrast to the prior art, by long-term elastification with a surprisingly favourable ratio between plasticity on the one hand and elasticity on the other hand.

The coatings, adhesives, sealants, embedding compounds or moulded articles based on the urea group-containing amine hardener mixtures according to the invention and epoxide resins are particularly highly suitable for all applications where good adhesion, resistance to chemicals, and high impact strength and impact resistance, associated with good flexibility and elasticity, are required over the long term.

Systems according to the invention are particularly highly suitable as corrosion prevention coatings. In particular when subjected to aggressive media, such as for example in the case of ballast tanks, the systems are characterised by good wet adhesion and good adhesion under cathode protection conditions.

Depending on the range of requirements, the properties of the urea group-containing amine hardener mixtures can be adjusted. If particularly flexible and elastic materials are required, the urea group-containing amine hardener mixture according to the invention is prepared from a large amount of part A) and a small amount of part B). If highly cross-linked, materials which are resistant to chemicals are required, the urea group-containing amine hardener mixture according to the invention is made up from a small proportion of part A) and a large proportion of part B).

EXAMPLES

All percentage data, unless stated otherwise, refers to weight. Long-term stress was simulated by 18 h annealing at 100° C.

Viscosity measurements were performed with a cone and plate viscometer, model SM/KP/LC, from PHYSICA.

I Preparing part A According to the Invention

Example 1

381.3 g of a polyetherpolyol with a functionality of 2.6 and an OH value of 43, prepared by simultaneous ethoxylation and propoxylation (EO/PO ratio=2:8) of a 2:1 mixture of propylene glycol and glycerol, and 845.6 g of a polyetherdiol with an OH value of 29, prepared by propoxylation of propylene glycol followed by ethoxylation (EP/PO ratio=2:8), are prepolymerised, after adding 0.07 g of 2-chloropropionic acid, with 126.8 g of 2,4-diisocyanatotoluene at 60–65° C. until the theoretical NCO content of 2.3% is achieved.

Then 645.9 g of a commercially available hydrocarbon resin with an OH content of 1.8% (Necires EPX L2, commercial product from Nevcin Polymers B.V., Uithoorn, Holland) are added, the reaction is catalysed with 0.4 g of tin(II) octoate and the mixture is stirred at 70–80° C. until the NCO content is less than 0.2%.

Blocked NCO content: 1.5%
Viscosity (23° C.): 24400 mPas

Example 2

425.0 g of a polyesterdiol with an OH value of 66, prepared by esterification of hexanediol-1,6 and neopentyl glycol in the molar ratio of 1:1 with adipic acid, 500.0 g of a polyetherdiol with an OH value of 56, prepared by mixed propoxylation and ethoxylation of propylene glycol (PO/EO ratio=50:50), and 4.5 g of trimethylol-propane are prepolymerised, after the addition of 0.06 g of 2-chloropropionic acid, with 174.0 g of 2,4-diisocyanatotoluene at 60–65° C. until the theoretical NCO content of 3.4% is achieved.

Then 741.2 g of a commercially available HC resin with an OH content of 1.9% (Novares LA 300, commercial product of VFT AG, Duisburg) are added, the reaction is catalysed with 0.37 g of tin(II) octoate and the mixture is stirred at 70–80° C. until the NCO content is less than 0.2%.

Blocked NCO content: 1.8%
Viscosity (23° C.): 119000 mPas

II Preparation of Urea Group-Containing Amine Hardener Mixture According to the Invention Example 3

169.4 g of the blocked polyisocyanate from example 1 and 130.6 g of isophorone diamine are stirred for 4 h at 80° C.

Viscosity (23° C.): 1650 mPas

Example 4

183.0 g of the blocked polyisocyanate from example 1 and 117.0 g of a commercially available polyamine-adduct hardener based on isophorone diamine/epoxide resin with an amine value of 6.5 eq./kg (hardener HY 847®, commercial product from Ciba Specialty Chemicals) are stirred for 4 h at 80° C.

Viscosity (23° C.): 12700 mPas

Example 5

161.2 g of the blocked polyisocyanate from example 1 and 138.8 g of a commercially available polyaminoamide hardener with an H-active equivalent weight of about 95 (Euredur® 250, commercial product from Ciba Specialty Chemicals) are stirred for 4 h at 8°° C.

Viscosity (23° C.): 9800 mPas

Example 6

168.8 g of the blocked polyisocyanate from example 2 and 131.2 g of isophorone diamine are stirred for 4 h at 80° C.

Viscosity (23° C.): 3310 mPas

Example 7

181.0 g of the blocked polyisocyanate from example 2 and 119.0 g of a commercially available polyamine-adduct hardener based on isophorone diamine/epoxide resin with an amine value of 6.5 eq./kg (hardener HY®, commercial product from Ciba Specialty Chemicals) are stirred for 4 h at 80° C.

Viscosity (23° C.): 21400 mPas

Example 8

160.6 g of the blocked polyisocyanate from example 2 and 139.4 g of a commercially available polyaminoamide hardener with an H-active equivalent weight of about 95 (Euredur® 250, commercial product from Ciba Specialty Chemicals) are stirred for 4 h at 80° C.

Viscosity (23° C.): 17300 mPas

Example 9

190.6 g of a polyetherpolyol with a functionality of 2.6 and an OH value of 43, prepared by simultaneous ethoxylation and propoxylation (EO/PO ratio=2:8) of a 2:1 mixture of propylene glycol and glycerol, and 422.8 g of a polyetherdiol with an OH value of 29, prepared by propoxylation of propylene glycol followed by ethoxylation (EO/PO ratio=2:8), are prepolymerised, after adding 0.03 g of 2-chloropropionic acid, with 63.4 g of 2,4-diisocyanatotoluene at 60–65° C. until the theoretical NCO content of 2.3% is achieved.

Then 322.9 g of a commercially available hydrocarbon resin with an OH content of 1.8% (Necirés® EPX L2, commercial product from Nevcin Polymers B.V., Uithoorn, Holland) are added, the reaction is catalysed with 0.2 g of tin(II) octoate and the mixture is stirred at 70–80° C. until the NCO content is less than 0.2%.

Then 770.6 g of isophorone diamine are added and the mixture is stirred for 4 h at 80° C.

Viscosity (23° C.): 1520 mPas

III Application Examples

Use of Urea Group-Containing Amine Hardener Mixtures in Combination with an Epoxide Resin Conventionally Used in Plastics and Coatings Technology Example 10

35.4 g of the adduct from example 3 are intimately mixed with 30.0 g of a standard epoxide resin (Epikote® 828 from Shell, epoxide equivalent weight 190). The mixture is applied to a metal sheet in a 0.1 mm thick layer. Curing takes place at room temperature.

The processing time (initial viscosity is doubled) is 25 minutes.

Initial viscosity (23° C.): 13,200 mPa·s

Erichsen indentation after storage for 14 days at RT (DIN ISO 1520): >9.0 mm

Erichsen indentation after annealing for 18 h at 100° C. (DIN ISO 1520): 7.5 mm

Example 11

33.0 g of the adduct from example 4 are intimately mixed with 30.0 g of a standard epoxide resin (Epikote® 828 from Shell, epoxide equivalent weight 190). The mixture is applied to a metal sheet in a 0.1 mm thick layer. Curing takes place at room temperature.

The processing time (initial viscosity is doubled) is 25 minutes.

Initial viscosity (23° C.): 14,300 mPa·s

Erichsen indentation after storage for 14 days at RT (DIN ISO 1520): >9.0 mm

Erichsen indentation after annealing for 18 h at 100° C. (DIN ISO 1520): 9.0 mm

Example 12

37.2 g of the adduct from example 5 are intimately mixed with 30.0 g of a standard epoxide resin (Epikote® 828 from Shell, epoxide equivalent weight 190). The mixture is applied to a metal sheet in a 0.1 mm thick layer. Curing takes place at room temperature.

The processing time (initial viscosity is doubled) is 30 minutes.

Initial viscosity (23° C.): 9,700 mPa·s

Erichsen indentation after storage for 14 days at RT (DIN ISO 1520): >9.0 mm

Erichsen indentation after annealing for 18 h at 100° C. (DIN ISO 1520): >9.0 mm Example 13

35.5 g of the adduct from example 6 are intimately mixed with 30.0 g of a standard epoxide resin (Epikote® 828 from Shell, epoxide equivalent weight 190). The mixture is applied to a metal sheet in a 0.1 mm thick layer. Curing takes place at room temperature.

The processing time (initial viscosity is doubled) is 15 minutes.

Initial viscosity (23° C.): 27,400 mPa·s

Erichsen indentation after storage for 14 days at RT (DIN ISO 1520): >9.0 mm

Erichsen indentation after annealing for 18 h at 100° C. (DIN ISO 1520): 7.5 mm

Example 14

33.2 g of the adduct from example 7 are intimately mixed with 30.0 g of a standard epoxide resin (Epikote® 828 from Shell, epoxide equivalent weight 190). The mixture is applied to a metal sheet in a 0.1 mm thick layer. Curing takes place at room temperature.

The processing time (initial viscosity is doubled) is 20 minutes.

Initial viscosity (23° C.): 19,800 mPa·s

Erichsen indentation after storage for 14 days at RT (DIN ISO 1520): >9.0 mm

Erichsen indentation after annealing for 18 h at 100° C. (DIN ISO 1520): >8.5 mm Example 15

37.4 g of the adduct from example 8 are intimately mixed with 30.0 g of a standard epoxy resin (Epikotee 828 from Shell, epoxide equivalent weight 190). The mixture is applied to a metal sheet in a 0.1 mm thick layer. Curing takes place at room temperature.

The processing time (initial viscosity is doubled) is 35 minutes.

Initial viscosity (23° C.): 13,400 mPa·s

Erichsen indentation after storage for 14 days at RT (DIN ISO 1520): >9.0 mm

Erichsen indentation after annealing for 18 h at 10° C. (DIN ISO 1520): >9.0 mm

Example 16

35.4 g of the adduct from example 9 are intimately mixed with 30.0 g of a standard epoxy resin (Epikote® 828 from Shell, epoxide equivalent weight 190). The mixture is applied to a metal sheet in a 0.1 mm thick layer. Curing takes place at room temperature.

The processing time (initial viscosity is doubled) is 25 minutes.

Initial viscosity (23° C.): 13,000 mPa·s

Erichsen indentation after storage for 14 days at RT (DIN ISO 1520): >9.0 mm

Erichsen indentation after annealing for 18 h at 100° C. (DIN ISO 1520): 7.5 mm

IV Examples not in Accordance with the Invention, as a Comparison

Example 17

946.6 g of a polyetherpolyol with a functionality of 2.6 and an OH value of 43, prepared by simultaneous ethoxylation and propoxylation (EO/PO ratio=2:8) of a 2:1 mixture of propylene glycol and glycerol, are prepolymerised, after the addition of 0.04 g of 2-chloropropionic acid, with 125.9 g of 2,4-diisocyanatotoluene for 5 hours at 80° until the theoretical NCO content of 2.8% is achieved.

Then 177.3 g of a technical grade nonylphenol isomer mixture is added. After catalysis with 0.14 g of tin(II) octoate, stirring is continued for 10 hours at 60° C. until the NCO content is less than 0.2%.

Blocked NCO content: 2.45%

Viscosity (23° C.): 106000 mPa·s 214.8 g of the blocked polyisocyanate and 85.2 g of isophorone diamine are stirred for 4 h at 80° C.

Viscosity (23° C.): 87000 mPa·s 27.9 g of the adduct are intimately mixed with 30.0 g of a standard epoxy resin (Epikote® 828 from Shell, epoxide equivalent weight 190). The mixture is applied to a metal sheet in a 0.1 mm thick layer. Curing takes place at room temperature.

The processing time (initial viscosity is doubled) is 15 minutes.

Initial viscosity (23° C.): 60,600 mPa·s

Erichsen indentation after storage for 14 days at RT (DIN ISO 1520): >9.0 mm

Erichsen indentation after annealing for 18 h at 100° C. (DIN ISO 1520): 5.5 mm

Example 18

28.8 g of the epoxide group-containing resin Rütapox VE 3318 and 15.6 g of the amine group-containing hardener Rütadur® H 550 (both products of Bakelite AG) are intimately mixed with 12.0 g of the hydrocarbon resin Novares® LA 700 with a hydroxyl group content of 2.25% (commercial product from VFT AG, Duisburg). The mixture is applied to a metal sheet in a 0.1 mm thick layer. Curing takes place at room temperature. The processing time (initial viscosity is doubled) is 15 minutes.

Initial viscosity (23° C.): 769 mPa·s

Erichsen indentation after storage for 14 days at RT (DIN ISO 1520): >9.0 mm

Erichsen indentation after annealing for 18 h at 100° C. (DIN ISO 1520): 3.0 mm

What is claimed is:

1. An urea group-containing, amine hardener mixture for epoxide resins, which is the reaction product of
   A) a polyisocyanate component comprising at least one organic polyisocyanate in which at least 95 mol. % of the NCO groups are reversibly blocked by reaction with at least one phenolic OH group-containing hydrocarbon resin having a hydroxyl group content (calculated as OH, molecular weight 17) of 0.1% to 10.0%, with
   B) at least one organic polyamine in an equivalent ratio of amine groups to blocked NCO groups of 2:1 to 50:1.

2. The urea group-containing amine hardener mixture of claim 1 wherein said organic polyisocyanate comprises an isocyanate group-containing prepolymer prepared by reacting (i) an aromatic polyisocyanate having a molecular weight of 174 to 300 and (ii) an ether and/or ester group-containing organic polyhydroxyl compound having a molecular weight of 1000 to 8000, in which the isocyanate groups are reversibly blocked by reaction with at least one phenolic OH group-containing hydrocarbon resin having a hydroxyl group content (calculated as OH, molecular weight 17) of 0.1% to 10.0%.

3. The urea group-containing amine hardener mixture of claim 1 wherein said phenolic OH group-containing hydrocarbon resin is liquid at room temperature, has a hydroxyl group content (calculated as OH, molecular weight 17) of 1.5% to 4.0% and comprises a member selected from the group consisting of coumarone/indene resins, petroleum resins or terpene resins.

4. The urea group-containing amine hardener mixture of claim 2 wherein said phenolic OH group-containing hydrocarbon resin is liquid at room temperature, has a hydroxyl group content (calculated as OH, molecular weight 17) of 1.5% to 4.0% and comprises a member selected from the group consisting of coumarone/indene resins, petroleum resins or terpene resins.

5. The urea group-containing amine hardener mixture of claim 1 wherein said organic polyamine comprises a diamine containing at least one cycloaliphatic ring and having a maximum molecular weight of 500.

6. The urea group-containing amine hardener mixture of claim 2 wherein said organic polyamine comprises a diamine containing at least one cycloaliphatic ring and having a maximum molecular weight of 500.

7. The urea group-containing amine hardener mixture of claim 3 wherein said organic polyamine comprises a diamine containing at least one cycloaliphatic ring and having a maximum molecular weight of 500.

8. The urea group-containing amine hardener mixture of claim 4 wherein said organic polyamine comprises a diamine containing at least one cycloaliphatic ring and having a maximum molecular weight of 500.

9. A process for preparing an urea group-containing amine hardener mixture which comprises reacting at a temperature of up to 200° C.
   A) a polyisocyanate component comprising at least one organic polyisocyanate in which at least 95 mol. % of the NCO groups are reversibly blocked by reaction with at least one phenolic OH group-containing hydrocarbon resin having a hydroxyl group content (calculated as OH, molecular weight 17) of 0.1% to 10.0%, with
   B) at least one organic polyamine in an equivalent ratio of amine groups to blocked NCO groups of 2:1 to 50:1.

10. The process of claim 9 which comprises reacting at a temperature of 50 to 100° C.

11. A composition containing the urea group-containing amine hardener mixture of claim 1 and an epoxide resin.

12. A coating, adhesive, sealant, embedding compound or molded article prepared from the composition of claim 11.

13. The urea group-containing amine hardener mixture according to claim 1, wherein the equivalent ratio of amine groups to blocked NCO groups is from 5:1 to 15:1.

14. The process according to claim 9, wherein the equivalent ratio of amine groups to blocked NCO groups is from 5:1 to 15:1.

15. An urea group-containing, amine hardener mixture for epoxide resins, which is the reaction product of a mixture consisting essentially of
   A) a polyisocyanate component comprising at least one organic polyisocyanate in which at least 95 mol. % of the NCO groups are reversibly blocked by reaction with at least one phenolic OH group-containing hydrocarbon resin having a hydroxyl group content (calculated as OH, molecular weight 17) of 0.1% to 10.0%, with
   B) at least one organic polyamine in an equivalent ratio of amine groups to blocked NCO groups of 5:1 to 15:1.

* * * * *